(12) United States Patent
Winterling et al.

(10) Patent No.: US 7,393,913 B2
(45) Date of Patent: Jul. 1, 2008

(54) POLYAMIDES

(75) Inventors: Helmut Winterling, Ludwigshafen (DE); Jürgen Demeter, Ludwigshafen (DE); Jürgen Deininger, Oftersheim (DE); Gad Kory, Gaiberg (DE); Oliver Sötje, Mannheim (DE); Ralf Neuhaus, Heidelberg (DE); Kurt Krempel, Rödersheim-Gronau (DE); Christoph Benisch, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 101 days.

(21) Appl. No.: 10/556,674

(22) PCT Filed: May 6, 2004

(86) PCT No.: PCT/EP2004/004816

§ 371 (c)(1), (2), (4) Date: Nov. 14, 2005

(87) PCT Pub. No.: WO2004/101647

PCT Pub. Date: Nov. 25, 2004

(65) Prior Publication Data

US 2007/0027295 A1 Feb. 1, 2007

(30) Foreign Application Priority Data

May 14, 2003 (DE) ................. 103 21 789

(51) Int. Cl.
*C08G 73/10* (2006.01)
(52) U.S. Cl. ....................... 528/312; 528/310
(58) Field of Classification Search ................. 528/315; 524/588

See application file for complete search history.

(56) References Cited

U.S. PATENT DOCUMENTS

| | | | | |
|---|---|---|---|---|
| 3,826,785 A | * | 7/1974 | Bruant | 528/315 |
| 3,975,377 A | * | 8/1976 | Poulain | 540/451 |
| 4,191,819 A | * | 3/1980 | Meyer et al. | 528/315 |
| 2002/0123560 A1 | * | 9/2002 | Audenaert et al. | 524/588 |

FOREIGN PATENT DOCUMENTS

| | | |
|---|---|---|
| CZ | 175888 | 5/1977 |
| EP | 0602241 | 6/1994 |

OTHER PUBLICATIONS

International Search Report No. PCT/EP2004/004816 dated Sep. 20, 2004, 2 pages.

* cited by examiner

*Primary Examiner*—James J. Seidleck
*Assistant Examiner*—Gregory Listvoyb
(74) *Attorney, Agent, or Firm*—Connolly Bove Lodge & Hutz, LLP

(57) ABSTRACT

Polyamide whose main chain contains a chemically bound N-alkyllactam, and processes for preparing such a polyamide and fibers, films and moldings comprising such a polyamide.

9 Claims, No Drawings

POLYAMIDES

This application claims priority from PCT/EP04/004816 filed May 6, 2004 and German Application DE 103 21 789.4 filed May 14, 2003, the disclosures of each application are incorporated herein by reference.

The present invention relates to a polyamide whose main chain contains a chemically bound N-alkyllactam.

The present invention further relates to a process for preparing such a polyamide and also to fibers, films and moldings comprising at least one such polyamide.

Polyamides, especially nylon-6 and nylon-6,6, are industrially important polymers. They are typically prepared from suitable monomers, such as caprolactam, adipic acid or hexamethylenediamine, which are reacted in the presence of water.

Polyamide polymers are typically shaped into molding compositions, for example into fibers, films or moldings.

Such molding compositions are often exposed to forces in use; these forces can lead to rupture of the molding composition and hence to destruction of the molding composition.

The yardstick is the tensile strain at break $\epsilon_b$ or the nominal strain $\epsilon_t$ as per DIN EN ISO 10350-1 in conjunction with DIN EN ISO 527-1.

The tensile strain at break indicates the relative elongation at the breaking stress when the break takes place before the yield point is reached; the nominal strain indicates relative elongation beyond the yield point. Elongation is reversible up to the yield point and irreversible beyond the yield point.

A high tensile strain at break is a desirable property for a molding composition, since it means that the molding composition is capable of absorbing an applied force elastically, returning back to the original shape after the force has died down.

It is an object of the present invention to provide a polyamide which has an enhanced DIN EN ISO 527-1 tensile strain at break compared with prior art polyamides and also a process for preparing such a polyamide.

We have found that this object is achieved by the polyamide defined at the beginning, a process for preparing it and also fibers, films and moldings comprising at least one such polyamide.

Polyamides are herein to be understood as being homopolymers, copolymers, blends and grafts of synthetic long-chain polyamides having recurring amide groups in the polymer main chain as an essential constituent. Examples of such polyamides are nylon-6 (polycaprolactam), nylon-6,6 (polyhexamethyleneadipamide), nylon-4,6 (polytetramethyleneadipamide), nylon-6,10 (polyhexamethylenesebacamide), nylon-7 (polyenantholactam), nylon-11 (polyundecanolactam), nylon-12 (polydodecanolactam). As well as polyamides known by the generic name of nylon, polyamides further include the aramids (aromatic polyamides), such as poly-meta-phenyleneisophthalamide (NOMEX® fiber, U.S. Pat. No. 3,287,324) or poly-para-phenyleneterephthalamide (KEVLAR® fiber, U.S. Pat. No. 3,671,542).

Polyamides can in principle be prepared by two methods.

In a polymerization from dicarboxylic acids and diamines and also in a polymerization from amino acids or their derivatives, such as aminocarbonitriles, aminocarboxamides, aminocarboxylate esters or aminocarboxylate salts, the amino and carboxyl end groups of the starting monomers or starting oligomers react with one another to form an amide group and water. The water can subsequently be removed from the polymer. In a polymerization from aminocarboxamides, the amino and amide end groups of the starting monomers or starting oligomers react with one another to form an amide group and ammonia. The ammonia can subsequently be removed from the polymer. When amino-carboxylic esters are polymerized, the amino and ester end groups of the starting monomers or oligomers react with one another to form an amide group and alcohol. The alcohol can subsequently be removed from the polymer. In the polymerization of aminocarboxylic nitriles, the nitrile groups can first react with water to form amide or carboxyl groups and the resulting aminocarboxylic amides or acids can be reacted as described. This polymerization reaction is customarily known as a polycondensation.

A polymerization from lactams as starting monomers or starting oligomers is customarily known as a polyaddition.

Such polyamides are obtainable by conventional processes, as described for example in DE-A-14 95 198, DE-A-25 58 480, EP-A-129 196 or in: Polymerization Processes, Interscience, New York, 1977, pages 424-467, especially pages 444-446, from monomers selected from the group consisting of lactams, omega-aminocarboxylic acids, omega-aminocarbonitriles, omega-aminocarboxamides, omega-aminocarboxylate salts, omega-aminocarboxylate esters, equimolar mixtures of diamines and dicarboxylic acids, dicarboxylic acid/diamine salts, dinitriles and diamines or mixtures thereof.

Useful monomers include monomers or oligomers of a $C_2$ to $C_{20}$, preferably $C_2$ to $C_{18}$, arylaliphatic or, preferably, aliphatic lactam such as enantholactam, undecanolactam, dodecanolactam or caprolactam, monomers or oligomers of $C_2$ to $C_{20}$, preferably $C_3$ to $C_{18}$, aminocarboxylic acids such as 6-aminocaproic acid or 11-aminoundecanoic acid, and salts thereof such as alkali metal salts, for example lithium, sodium or potassium salts, monomers or oligomers of $C_2$ to $C_{20}$, preferably $C_3$ to $C_{18}$, aminocarbonitriles such as 6-aminocapronitrile or 11-aminoundecanonitrile, monomers or oligomers of $C_2$ to $C_{20}$ amino acid amides such as 6-aminocapronamide or 11-aminoundecanamide, esters, preferably $C_1$-$C_4$ alkyl esters, such as methyl, ethyl, n-propyl, i-propyl, n-butyl, i-butyl or s-butyl esters, of $C_2$ to $C_{20}$, preferably $C_3$ to $C_{18}$, aminocarboxylic acids, such as 6-aminocaproic acid esters, for example methyl 6-aminocaproate, or 11-aminoundecanoic acid esters, for example methyl 11-aminoundecanoate, monomers or oligomers of a $C_2$ to $C_{20}$, preferably $C_2$ to $C_{12}$, alkyldiamine, such as tetramethylenediamine or, preferably, hexamethylenediamine, with a $C_2$ to $C_{20}$, preferably $C_2$ to $C_{14}$, aliphatic dicarboxylic acid or mono- or dinitriles thereof, such as sebacic acid, dodecanedioic acid, adipic acid, sebacic acid dinitrile, decane-1,10-dinitrile or adiponitrile, monomers or oligomers of a $C_2$ to $C_{20}$, preferably $C_2$ to $C_{12}$, alkyldiamine, such as tetramethylenediamine or, preferably, hexamethylenediamine, with a $C_8$ to $C_{20}$, preferably $C_8$ to C12, aromatic dicarboxylic acid or derivatives thereof, for example chlorides, such as naphthalene-2,6-dicarboxylic acid, preferably isophthalic acid or terephthalic acid, monomers or oligomers of a $C_2$ to $C_{20}$, preferably $C_2$ to $C_{12}$, alkyldiamine, such as tetramethylenediamine or, preferably, hexamethylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, monomers or oligomers of a $C_6$ to $C_{20}$, preferably $C_6$ to $C_{10}$, aromatic diamine, such as m- or p-phenylenediamine, with a $C_2$ to $C_{20}$, preferably $C_2$ to $C_{14}$, aliphatic dicarboxylic acid or mono- or dinitriles thereof, such as sebacic acid, dodecanedioic acid, adipic acid, sebacic acid dinitrile, decane-1,10-dinitrile or adiponitrile, monomers or oligomers of a $C_6$ to $C_{20}$, preferably $C_6$ to $C_{10}$, aromatic diamine, such as m- or p-phenylenediamine, with a $C_8$ to $C_{20}$, preferably $C_8$ to $C_{12}$, aromatic dicarboxylic acid or derivatives thereof, for example chlorides, such as naphthalene-2,6-dicarboxylic acid, preferably isophthalic acid or terephthalic acid, monomers or oligomers of a $C_6$ to $C_{20}$, preferably $C_6$ to $C_{10}$, aromatic diamine, such as m- or p-phenylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, monomers or oligomers of a $C_7$ to $C_{20}$, preferably $C_8$ to $C_{18}$, arylaliphatic diamine, such as m- or p-xylylenediamine, with a $C_2$ to $C_{20}$, preferably $C_2$ to $C_{14}$, aliphatic dicarboxylic acid or mono- or dinitriles thereof, such as sebacic acid, dodecanedioic acid, adipic acid, sebacic acid dinitrile, decane-1,10-dinitrile or adiponitrile, monomers or oligomers of a $C_7$ to $C_{20}$, preferably $C_8$ to $C_{18}$, arylaliphatic diamine, such as m- or p-xylylenediamine, with a $C_6$ to $C_{20}$, preferably $C_6$ to $C_{10}$, aromatic dicarboxylic acid or derivatives thereof, for example chlorides, such as naphthalene-2,6-dicarboxylic acid, preferably isophthalic acid or terephthalic acid, monomers or oligomers of a $C_7$ to $C_{20}$, preferably $C_8$ to $C_{18}$, arylaliphatic diamine, such as m- or p-xylylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, and homopolymers, copolymers, blends and grafts of such starting monomers or starting oligomers.

Useful oligomers include, in particular, the dimers, trimers, tetramers, pentamers or hexamers of said monomers or of mixtures of such monomers.

In a preferred embodiment, the lactam used is caprolactam, the diamine used is tetramethylenediamine, hexamethylenediamine or their mixtures and the dicarboxylic acid used is adipic acid, sebacic acid, dodecanedioic acid, terephthalic acid, isophthalic acid or mixtures thereof. Particular preference is given to the lactam being caprolactam, the diamine being hexamethylenediamine and the dicarboxylic acid being adipic acid or terephthalic acid or their mixtures.

Particular preference is given to those starting monomers or starting oligomers which on polymerization lead to the polyamides nylon-6, nylon-6,6, nylon-4,6, nylon-6,10, nylon-6,12, nylon-7, nylon-11 or nylon-12 or the aramids poly-meta-phenylene-isophthalamide or poly-para-phenyleneterephthalamide, especially to nylon-6 or nylon-6,6.

In a preferred embodiment, the polyamides may be prepared using one or more chain regulators. Useful chain regulators advantageously include compounds having one or more, such as two, three or four, preferably two in the case of systems in the form of fibers, amino groups reactive in polyamide formation or one or more, such as two, three or four, preferably two in the case of systems in the form of fibers, carboxyl groups reactive in polyamide formation.

The first case provides polyamides wherein the monomers and chain regulators used for preparing said polyamide have a higher number of amino groups, or their equivalents, used for forming said polymer chain than carboxylic acid groups, or their equivalents, used for forming said polymer chain.

The second case provides polyamides wherein the monomers and chain regulators used for preparing said polyamide have a higher number of carboxylic acid groups, or their equivalents, used for forming said polymer chain than amino groups, or their equivalents, used for forming said polymer chain.

Useful chain regulators advantageously include monocarboxylic acids, such as alkane-carboxylic acids, for example acetic acid, propionic acid, such as benzene- or naphthalene-monocarboxylic acid, for example benzoic acid, dicarboxylic acids, such as $C_4$-$C_{10}$-alkanedicarboxylic acid, for example adipic acid, azelaic acid, sebacic acid, dodecanedioic acid, $C_5$-$C_8$-cycloalkanedicarboxylic acids, for example cyclohexane-1,4-dicarboxylic acid, benzene- or naphthalenedicarboxylic acid, for example terephthalic acid, isophthalic acid, naphthalene-2,6-dicarboxylic acid, $C_2$ to $C_{20}$, preferably $C_2$ to $C_{12}$, alkylamines, such as cyclohexylamine, $C_6$ to $C_{20}$, preferably C6 to $C_{10}$, aromatic mono-amines, such as aniline, or $C_7$ to $C_{20}$, preferably $C_8$ to $C_{18}$, arylaliphatic monoamines, such as benzylamine, diamines, such as $C_4$-$C_{10}$-alkanediamines, for example hexamethylenediamine.

The chain regulators may be unsubstituted or substituted, for example by aliphatic groups, preferably $C_1$-$C_8$-alkyl groups, such as methyl, ethyl, i-propyl, n-propyl, n-butyl, i-butyl, s-butyl, n-pentyl, n-hexyl, n-heptyl, n-octyl, 2-ethylhexyl, OH, =O, $C_1$-$C_8$-alkoxy, COOH, $C_2$-$C_6$-carbalkoxy, $C_1$-$C_{10}$-acyloxy, or $C_1$-$C_{16}$-alkylamino, sulfonic acid or salts thereof, such as alkali or alkaline earth metal salts, cyano or halogens, such as fluorine, chlorine, bromine. Examples of substituted chain regulators are sulfoisophthalic acid and alkali or alkaline earth metal salts thereof, such as lithium, sodium or potassium salts, sulfoisophthalic esters, for example with $C_1$-$C_{16}$-alkanols, or sulfoisophthalic acid mono- or diamides, especially with monomers suitable for forming polyamides and bearing at least one amino group, such as hexamethylenediamine or 6-aminocaproic acid.

Preferred chain regulators are sterically hindered piperidine derivatives of the formula

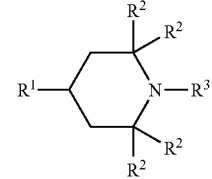

where $R^1$ is a functional group capable of amide formation with the polymer chain of the polyamide, preferably a group $-(NH)R^5$, in which $R^5$ is hydrogen or $C_1$-$C_8$ alkyl or a carboxyl group, or a carboxyl derivative, or a group $-(CH_2)_x(NH)R^5$, in which x is 1 to 6 and $R^5$ is hydrogen or $C_1$-$C_8$ alkyl, or a group $-(CH_2)_y$COOH, in which y is 1 to 6, or a $-(CH_2)_y$COOH acid derivative, in which y is 1 to 6, especially a group $-NH_2$, $R^2$ is an alkyl group, preferably a $C_1$-$C_4$ alkyl group such as methyl, ethyl, n-propyl, i-propyl, n-butyl, i-butyl, s-butyl, t-butyl, especially a methyl group, $R^3$ is hydrogen, $C_1$-$C_4$ alkyl or $O-R^4$, in which $R^4$ is hydrogen or $C_1$-$C_7$ alkyl, $R^3$ being hydrogen in particular.

In such compounds, steric hindrance usually prevents the tertiary amino groups, and especially the secondary amino groups, of the piperidine ring systems from reacting.

A particularly preferred sterically hindered piperidine derivative is 4-amino-2,2,6,6-tetramethylpiperidine.

A chain regulator may advantageously be used in amounts of not less than 0.001 mol %, preferably not less than 0.01 mol %, especially not less than 0.03 mol % and more preferably not less than 0.08 mol %, based on 1 mol of acid amide groups of the polyamide.

A chain regulator may advantageously be used in amounts of not more than 2.0 mol %, preferably not more than 1 mol %, especially not more than 0.6 mol %, and more preferably not more than 0.5 mol %, based on 1 mol of acid amide groups of the polyamide.

In accordance with the present invention, the main chain of the polyamide contains a chemically bound N-alkyllactam.

Whenever the present invention refers to N-alkyllactam, the term shall comprehend not only such an N-alkyllactam but also a mixture of such N-alkyllactams.

In a preferred embodiment, the N-alkyllactam is an N—$C_1$-$C_{10}$-alkyllactam, preferably an N-alkyllactam selected from the group consisting of N-methyllactam, N-ethyllactam, N-n-propyllactam, N-i-propyllactam, N-n-butyllactam, N-i-butyllactam and N-t-butyllactam, especially an N-ethyllactam.

Useful N-alkyllactams are also those having from 3 to 10 carbon atoms in the lactam ring, preferably those in which the lactam ring is selected from the group consisting of pyrrolidone, piperidone and caprolactam, especially caprolactam.

The lactam ring may be substituted, for example by one or more alkyl groups, preferably $C_1$-$C_{10}$-alkyl groups, especially methyl, ethyl, n-propyl, i-propyl, n-butyl, i-butyl, t-butyl, halogen, such as fluorine, chlorine, bromine, haloalkyl, such as trifluoromethyl. In a preferred embodiment, the lactam ring is unsubstituted.

In a particularly preferred embodiment, the N-alkyllactam is N-ethylcaprolactam.

Such N-alkyllactams and their preparation are known per se.

The level of N-alkyllactam may advantageously be not more than 0.001 mol %, preferably not less than 0.01 mol %, especially not more than 0.03 mol % and more preferably not less than 0.08 mol %, based on 1 mol of acid amide groups of the polyamide.

The level of N-alkyllactam may advantageously be not more than 2.0 mol %, preferably not more than 1 mol %, especially not more than 0.6 mol % and more preferably not more than 0.5 mol %, based on 1 mol of acid amide groups of the polyamide.

The polyamides of the present invention are obtainable in a process which comprises converting monomers, oligomers or mixtures thereof suitable for forming a polyamide into a polyamide in the presence of an N-alkyllactam or of a compound from which an N-alkyllactam is released under the reaction conditions for preparing the polyamide.

The polyamides of the present invention may be prepared using the process conditions customary for preparing polyamides from the corresponding monomers, as described for example in DE-A-14 95 198, DE-A-25 58 480, EP-A-129 196, DE-A-19 709 390, DE-A-35 34 817, WO 99/38908, WO 99/43734, WO 99/43732, WO 00/24808, WO 01/56984 or in Polymerization Processes, Interscience, New York, 1977, pages 424-467, especially pages 444-446.

In a preferred embodiment, the polymerization or polycondensation of the process according to the present invention may be carried out in the presence of at least one pigment. Preferred pigments are titanium dioxide, preferably in the anatase or rutile crystal form, or colored compounds of the organic or inorganic kind. The pigments are preferably added in an amount from 0 to 5 parts by weight and especially from 0.02 to 2 parts by weight, based in each case on 100 parts by weight of polyamide. The pigments may be added to the reactor with the starting materials or separately therefrom.

Furthermore, the polyamides may be prepared not only by the two, preferred processes mentioned but also by anionic polymerization.

An anionic polymerization process typically comprises reacting a) a lactam or a mixture of lactams, b) a lactamate or a compound which releases a lactamate from a lactam as per a), or mixtures of such components, and c) a polymerization-regulating activator with one another to obtain a polyamide.

Processes for anionic polymerization of lactams, also known as alkaline polymerization of lactams, and also suitable compounds a), b) and c) are general common knowledge, for example from U.S. Pat. No. 3,206,418, U.S. Pat. No. 3,207,713, U.S. Pat. No. 3,494,999, U.S. Pat. No. 3,793,255, U.S. Pat. No. 4,233,433, U.S. Pat. No. 4,393,193, U.S. Pat. No. 4,503,014, U.S. Pat. No. 5,747,634, WO-A-00/58387, WO-A-01/49906, International Polymer Processing 16(2) (2001) 172-182 or Fourné, Synthetische Fasern, Carl Hanser Verlag, Munich/Vienna, 1995, pages 38-39.

The polyamides of the present invention may advantageously be used for producing fibers, films and moldings comprising such a polyamide or, more specifically, consisting of such a polyamide.

EXAMPLES

The solution viscosity reported in the examples was measured as a relative solution viscosity in 96% sulfuric acid as per DIN 51562-1 to -4.

Specifically, 1 g of polymer was weighed out per 100 ml of solution and the flow time was measured in a Ubbelohde viscometer against the pure solvent.

Inventive Example 1

In a pressure vessel, 500 kg (4419 mol) of caprolactam, 50 kg of completely ion-free water and 1 271 g (9 mol) of N-ethylcaprolactam were heated under nitrogen to an internal temperature of 270° C., immediately thereafter let down to atmospheric over an hour, supplementarily condensed for 60 minutes and discharged.

The discharged polyamide was extracted, dried and heat-treated in the solid state to a relative solution viscosity of RV=2.72.

Comparative Example 1

Inventive example 1 was repeated except that no N-ethylcaprolactam was added. The relative solution viscosity after heat treatment was RV=2.73.

Example 2

The polymers prepared as per inventive example 1 and comparative example 1 were compounded in an extruder with 30% by weight of OCF 123 D 10 P glass fiber (from OCF) and 7% by weight of Lupolen KR 1270 rubber (from BASF Aktiengesellschaft) (the percentages are based on the readycompounded material). The relative solution viscosity after compounding was 2.80 in both cases.

The two compounded materials were subjected to a measurement of the tensile strain at break as per ISO 527. The following result was obtained:

Normalized tensile strain at break for polymer from inventive example 1:6% Normalized tensile strain at break for polymer from comparative example 1:4%

Thus, the polymer prepared as per inventive example 1 has a 50% higher tensile strain at break than the polymer prepared as per comparative example 1.

We claim:

1. A polyamide whose main chain comprises a chemically bound N-alkylcaprolactam wherein the N-alkylcaprolactam content is in the range from 0.001 mol % to 2 mol %, based on 1 mol of acid amide groups of the polyamide.

2. The polyamide according to claim 1 wherein the N-alkylcaprolactam is an N—$C_1$-$C_{10}$-alkylcaprolactam.

3. The polyamide according to claim 1 wherein the N-alkylcaprolactam is selected from the group consisting of N-n-methylcaprolactam, N-i-ethylcaprolactam, N-n-propylcaprolactam, N-i-propylcaprolactam, N-n-butylcaprolactam, N-i-butylcaprolactam and N-t-butylcaprolactam.

4. The polyamide according to claim 1 wherein the N-alkylcaprolactam is an N-ethylcaprolactam.

5. A process for preparing a polyamide, which comprises converting monomers suitable for forming a polyamide in the presence of an N-alkylcaprolactam according to claim 2.

6. A process for preparing a polyamide, which comprises converting oligomers suitable for forming a polyamide into a polyamide in the presence of an N-alkylcaprolactam according to claim 2.

7. Fibers, films and moldings comprising a polyamide according to claim 1.

8. The polyamide according to claim 3 wherein the N-alkylcaprolactam content is in the range from 0.001 mol % to 2 mol %, based on 1 mol of acid amide groups of the polyamide.

9. The polyamide according to claim 4 wherein the N-alkylcaprolactam content is in the range from 0.001 mol % to 2 mol %, based on 1 mol of acid amide groups of the polyamide.

* * * * *